US012521988B2

(12) United States Patent
Kido

(10) Patent No.: US 12,521,988 B2
(45) Date of Patent: Jan. 13, 2026

(54) LIQUID EJECTION HEAD AND RECORDING APPARATUS

(71) Applicant: CANON KABUSHIKI KAISHA, Tokyo (JP)

(72) Inventor: Takahito Kido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 18/372,854

(22) Filed: Sep. 26, 2023

(65) Prior Publication Data

US 2024/0109323 A1 Apr. 4, 2024

(30) Foreign Application Priority Data

Sep. 29, 2022 (JP) ................................ 2022-155845

(51) Int. Cl.
*B41J 2/14* (2006.01)
*B41J 2/165* (2006.01)
*B41J 29/17* (2006.01)

(52) U.S. Cl.
CPC ............ *B41J 2/16532* (2013.01); *B41J 2/14* (2013.01); *B41J 29/17* (2013.01)

(58) Field of Classification Search
CPC . B41J 2/16532; B41J 2/14; B41J 29/17; B41J 2/1433; B41J 2/14024
See application file for complete search history.

(56) References Cited

U.S. PATENT DOCUMENTS

2005/0104926 A1* 5/2005 Yamada .............. B41J 2/16552 347/34
2007/0285465 A1* 12/2007 Shibata ................ B41J 2/1753 347/47
2011/0050828 A1* 3/2011 Fujii ..................... B41J 2/1631 347/110
2020/0079086 A1* 3/2020 Asai .................... B41J 2/14072

FOREIGN PATENT DOCUMENTS

JP 2014-040021 A 3/2014

* cited by examiner

*Primary Examiner* — Jason S Uhlenhake
(74) *Attorney, Agent, or Firm* — Venable LLP

(57) ABSTRACT

A liquid ejection head includes a base substrate including a flow passage of liquid formed therein; chips disposed on the base substrate and configured to eject the liquid; and a cover member disposed on the base substrate so as to surround the chips. A sealing resin is applied to gaps between a plurality of the chips and the cover member, a distance of the gaps between the chips and the cover member is non-uniform, and the gaps are each provided with a protrusion.

11 Claims, 17 Drawing Sheets

A-A' CROSS-SECTIONAL VIEW

B-B' CROSS-SECTIONAL VIEW

C-C' CROSS-SECTIONAL VIEW
(BEFORE APPLICATION)

C-C' CROSS-SECTIONAL VIEW
(AFTER APPLICATION)

D-D' CROSS-SECTIONAL VIEW

E-E' CROSS-SECTIONAL VIEW
(BEFORE APPLICATION)

E-E' CROSS-SECTIONAL VIEW
(AFTER APPLICATION)

LIQUID EJECTION HEAD AND RECORDING APPARATUS

BACKGROUND OF THE INVENTION

Field of the Invention

The present invention relates to a liquid ejection head and a recording apparatus.

Description of the Related Art

A recording head (print head) of an inkjet recording apparatus generally adopts a form in which liquid ejection chips are bonded onto a base substrate on which a liquid flow passage is formed. When gaps are produced between the liquid ejection chips and another member such as the base substrate, ink or dust enters these gaps. Drops of this ink or dust during printing make a printing target material dirty. By contrast with this, Japanese Patent Application Publication No. 2014-040021 employs a configuration where a sealing resin is applied between a base substrate, to which chips are attached, and the chips, and ink or dust hardly enters therein.

SUMMARY OF THE INVENTION

When the height of the sealing resin applied between the base substrate and the chips is too high, the sealing resin goes on the chips, buries an opening for ejecting ink, and causes faulty printing. On the other hand, when the height of the sealing resin is low, there is a problem that a gap is produced between a member that includes a suctioning mechanism used for cleaning, and the sealing resin in a process of cleaning chip surfaces, sufficient suctioning cannot be performed, and cleaning cannot be performed well. Hence, it is necessary to control the height of the sealing resin within a constant range, and it is desired to suppress variations of the height at each portion.

According to the configuration of Japanese Patent Application Publication No. 2014-040021, rectangular chips are disposed in parallel, and widths of gaps between a cover member and the chips, and gaps between chips are substantially uniform. When a sealing resin is applied to the gaps in this configuration, the widths of the gaps are uniform, and therefore it is easy to uniformly control the liquid level height of the sealing resin. However, there is a case where a plurality of chips are inclined and disposed such as a case where, for example, a plurality of parallelogram chips are inclined diagonally and disposed so as to overlap nozzles on the same row of the neighboring chips and avoid blank dots. In such a case, the widths of the gaps between the chips and the cover member are not uniform, and therefore it is difficult to control the height of the sealing resin uniformly or within a constant range.

The present invention has been made with the above problem in view, and an object of the present invention is to provide a technique that, when widths of gaps between a plurality of chips and a cover member disposed at a liquid ejection head are not uniform, controls within a constant range a liquid level height of a sealing resin to be applied to the gaps.

The present invention provides a liquid ejection head comprising:

a base substrate including a flow passage of liquid formed therein;

chips disposed on the base substrate and configured to eject the liquid; and a cover member disposed on the base substrate so as to surround the chips, and in which a sealing resin is applied to gaps between a plurality of the chips and the cover member, wherein a distance of the gaps between the chips and the cover member is non-uniform, and the gaps are each provided with a protrusion.

The present invention also provides a recording apparatus comprising:

a liquid ejection head; and a cleaning mechanism configured to clean the liquid ejection head, wherein the liquid ejection head includes a base substrate including a flow passage of liquid formed therein.

chips disposed on the base substrate and configured to eject the liquid, and a cover member disposed on the base substrate so as to surround the chips, a sealing resin is applied to gaps between a plurality of the chips and the cover member, a distance of the gaps between the chips and the cover member is non-uniform, the gaps are each provided with a protrusion, and the cleaning mechanism includes a tube that comes into contact with a surface of the liquid ejection head on which the chips are disposed, and performs suctioning while moving.

According to the present invention, it is possible to provide a technique that, when widths of gaps between a plurality of chips and a cover member disposed at a liquid ejection head are not uniform, controls within a constant range a liquid level height of a sealing resin to be applied to the gaps.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. Note that dimensions, materials, and shapes of components, relative arrangement thereof, and the like described in the embodiments need to be changed as appropriate depending on configurations and various conditions of apparatuses to which the invention is applied, and are not intended to limit the scope of the present invention to the following embodiments.

Embodiment 1

Apparatus Configuration

Figure 1:
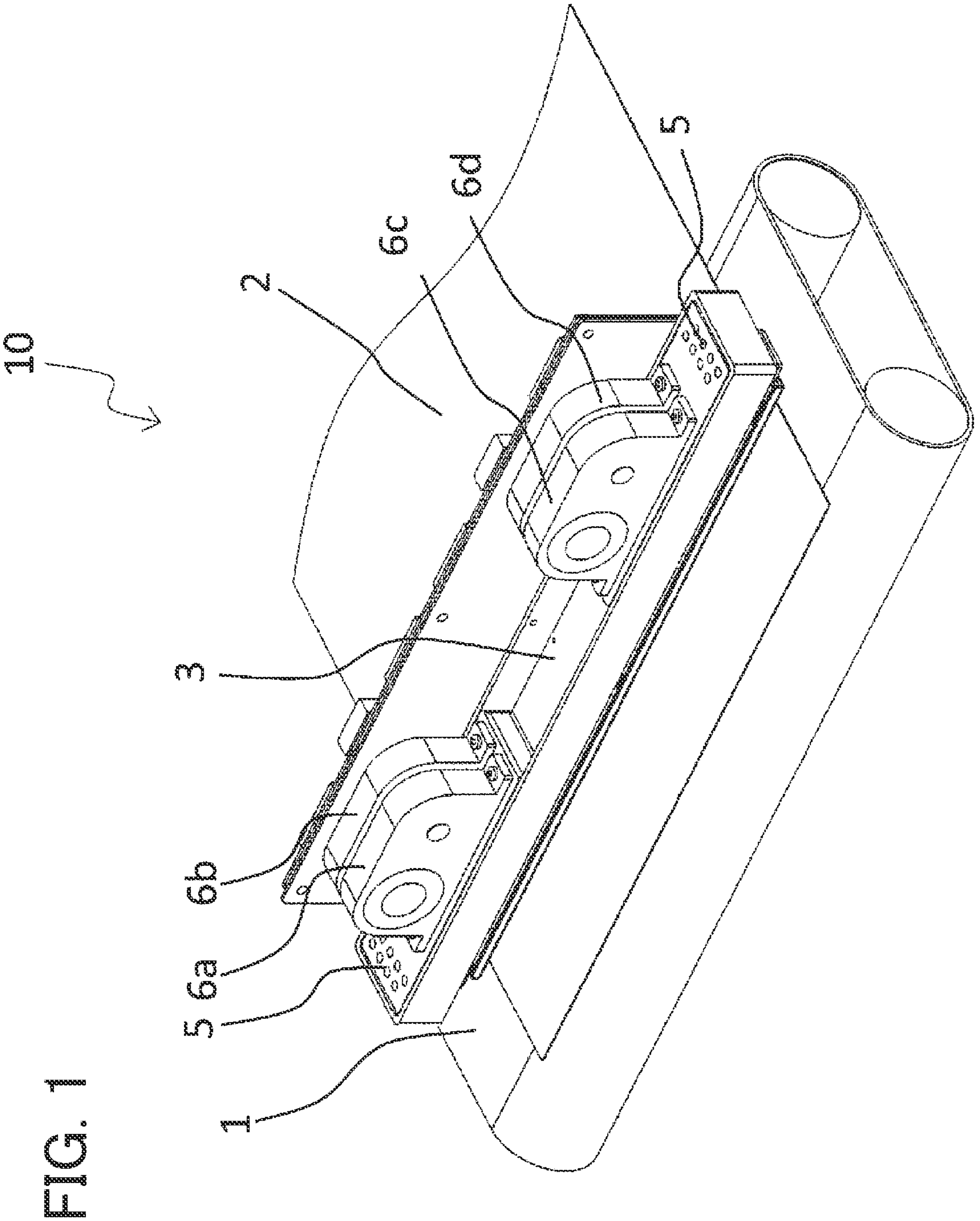
FIG. 1 is a schematic perspective view illustrating main portions of a liquid ejection apparatus including a liquid ejection head.
Figure 2:
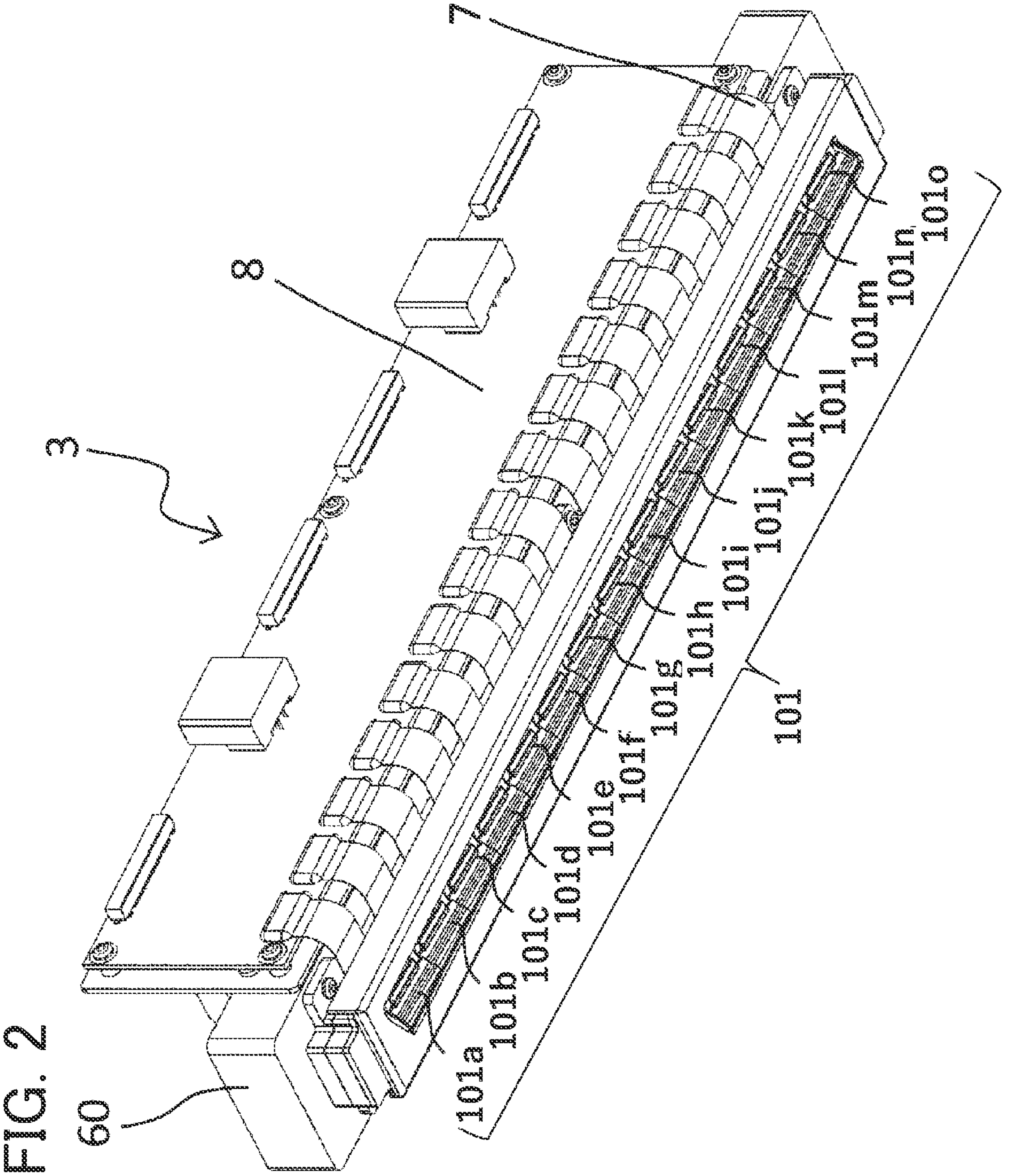
FIG. 2 is a schematic perspective view illustrating the liquid ejection head of the liquid ejection apparatus seen from an ejection port formation surface side.

FIG. 1 is a schematic perspective view illustrating part of an inkjet recording apparatus 10 (hereinafter, also referred to as a recording apparatus) that is an example of a liquid ejection apparatus to which the present invention is applied, and that ejects liquid ink and performs recording. FIG. 2 is a schematic perspective view illustrating an example of a liquid ejection head 3 of the recording apparatus 10 illustrated in FIG. 1.

The recording apparatus 10 includes a transport unit 1 that transports a recording target medium 2, the liquid ejection head 3 (inkjet recording head) that includes liquid ejection chips 101 (hereinafter, referred to simply as the chips 101) made of silicone and illustrated in FIG. 2, an outer housing (not illustrated), a control mechanism (not illustrated), and the like. Furthermore, the recording apparatus 10 includes a cleaning mechanism 30 to be described later with reference to FIG. 4. The liquid ejection head 3 is the so-called line-type liquid ejection head 3 in which the plurality of chips 101 are aligned on a support member 60 across a width equal to a recording width of the recording target medium 2 in a direction substantially perpendicular to a transport direction of the recording target medium 2 as illustrated in FIG. 2.

The liquid ejection head 3 is electrically connected with a wiring substrate (not illustrated) that sends power and an ejection control signal. A liquid supply mechanism is a mechanism in which liquid supply means that is a supply route for supplying ink to the liquid ejection head 3, a main tank, and a buffer tank (all of which are not illustrated) are fluidly connected. A control mechanism controls driving of the liquid ejection head 3, driving of each member of the transport unit 1, driving of the cleaning mechanism 30, and the like. The recording apparatus 10 causes these components to cooperate to perform recording on the recording target medium 2 in one path. The recording apparatus 10 can also perform continuous recording by continuously or intermittently transporting the plurality of recording target media 2. As the recording target medium 2, cut paper or continuous roll paper can be also used. A film or a resin may be the recording target medium. The liquid ejection head 3 may be a mono-color printing head that uses single ink, or may be a full-color printing head that uses inks of multiple colors (e.g., four colors of cyan C, magenta M, yellow Y, and black K).

As illustrated in FIG. 1, liquid connection parts 5 provided at both ends of the liquid ejection head 3 are portions that connect a supply route of a recording apparatus body and a liquid route of the liquid ejection head 3. Thus, ink is supplied from the supply route of the recording apparatus body to the liquid ejection head 3, and the ink having passed through the liquid route in the liquid ejection head 3 is collected to the supply route of the recording apparatus body. Thus, the ink circulates passing through the supply route of the recording apparatus body and the liquid route of the liquid ejection head 3. Note that pressure adjustment mechanisms 6*a*, 6*b*, 6*c*, and 6*d* provided to a head adjust supply pressures during circulation.

FIG. 2 illustrates the line type liquid ejection head 3 in which the plurality of chips 101 that can each eject liquid ink are aligned on one straight line. That is, 15 chips 101*a* to 101*o* are disposed in-line. The number of the chips 101 is 15 in the illustrated example, yet can be increased or decreased as appropriate according to a desired recording width. In addition to these chips 101, the liquid ejection head 3 includes an electrical wiring substrate 8 that is electrically connected to the wiring substrate (not illustrated) of the recording apparatus body with a flexible wiring substrate 7 interposed therebetween.

Head Configuration

Figure 3:
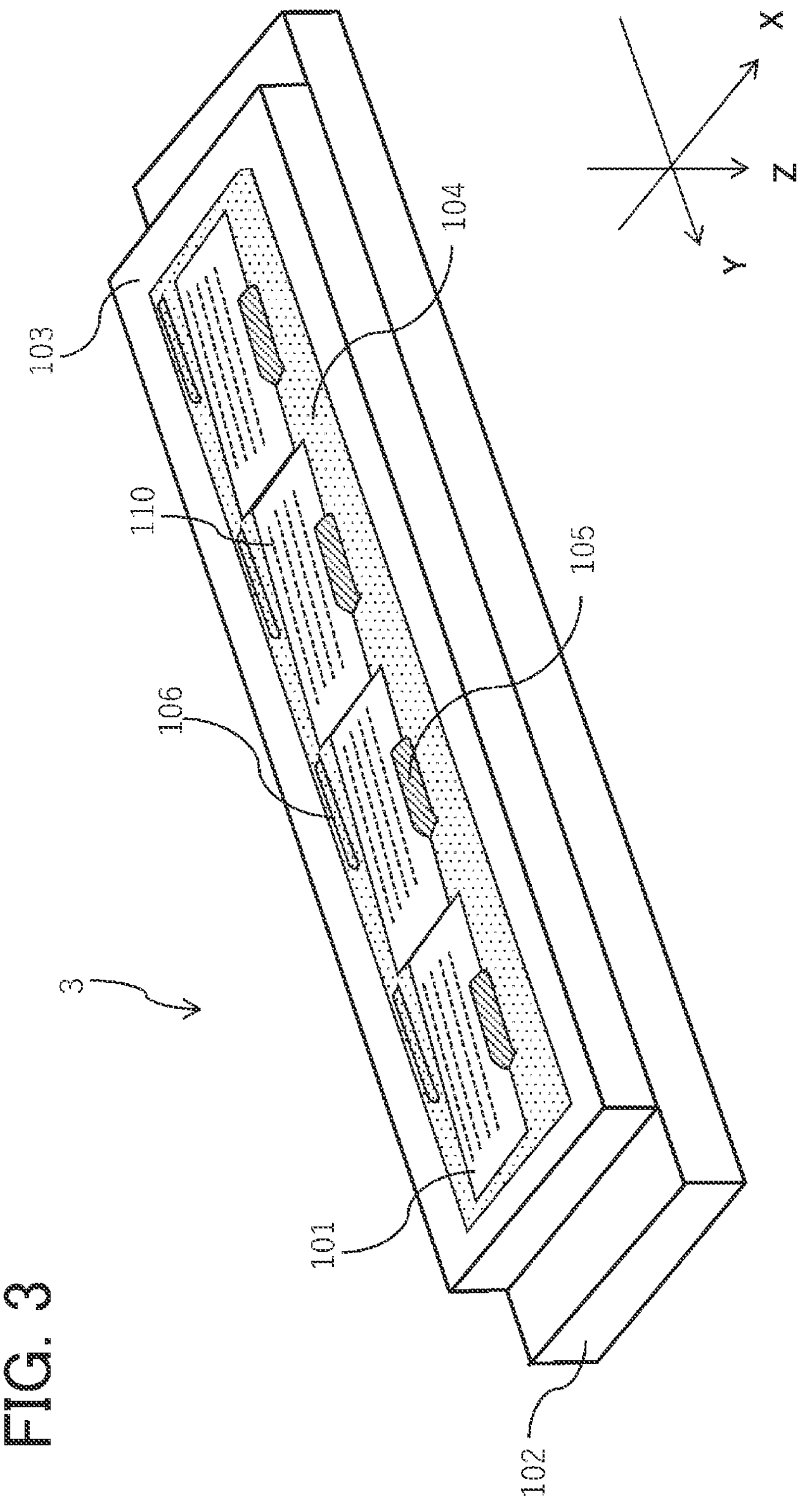
FIG. 3 is a perspective view of the liquid ejection head according to embodiment 1.
Figure 10:
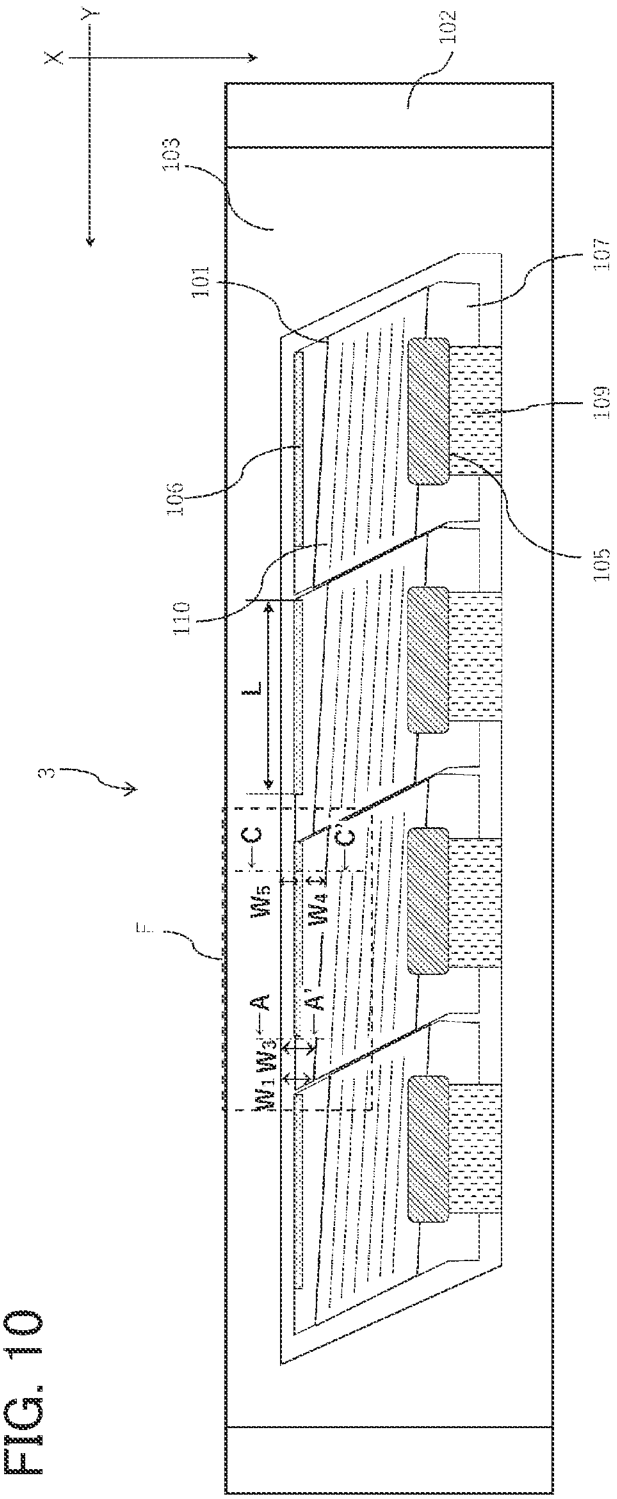
FIG. 10 is a plan view of the liquid ejection head before a sealing resin is applied according to embodiment 1.

FIG. 3 is a perspective view illustrating a configuration of the liquid ejection head 3 according to the present embodiment. FIG. 10 is a plan view of the liquid ejection head 3 before a sealing resin is applied. As described above, the liquid ejection head 3 includes the chips 101 that include liquid ejection nozzles 110 (referred to simply as the nozzles 110) that eject inks that are recording liquids. The present embodiment employs a configuration including the four parallelogram chips 101. In this regard, the number of chips is not limited to this. The chips 101 are bonded to a chip support member 107 using an adhesive. The chip support member 107 is disposed on a base substrate 102 including a liquid flow passage formed therein. The liquid flow passage is a flow passage that ink passes through. As illustrated in FIG. 10, the chips 101 are inclined and disposed such that the nozzles 110 of the adjacent chips 101 are continuously disposed. Thus, when the plurality of chips 101 are seen as one set, a ridge of the plurality of chips 101 is non-linear in an alignment direction of the chips 101. As illustrated in FIG. 10, the chip 101 is electrically bonded to the electrical wiring substrate 109. A bonding portion of the chip 101 and the electrical wiring substrate 109 is sealed by a sealing member 105.

The present invention employs a configuration where protrusions 106 are provided in gaps between the plurality of chips 101 and a cover member 103 made of a resin and disposed so as to surround the plurality of chips 101. After the cover member 103 is bonded, a sealing resin 104 is applied to bury gaps between the chips 101, the cover member 103, and the protrusions 106. The sealing resin can be selected as appropriate from a thermosetting resin, a moisture curing resin, a UV curing resin, and the like. In the present embodiment, as the sealing resin, a urethane resin obtained by mixing and curing an isocyanate compound and a phenolic compound at a normal temperature is used.

Cleaning Mechanism

Figure 4:
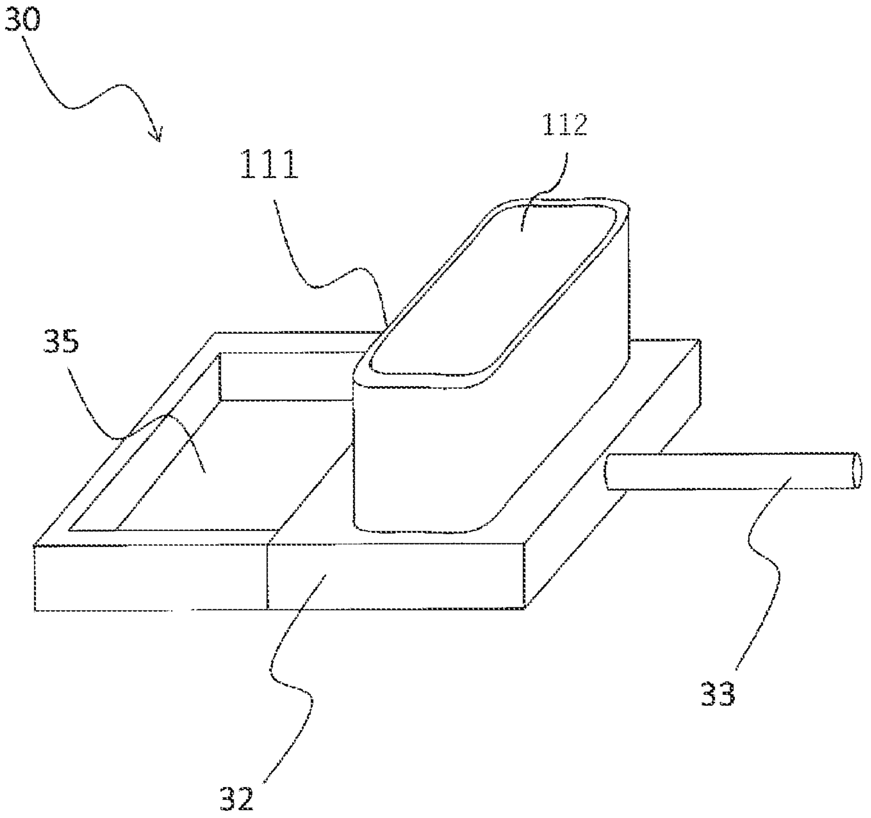
FIG. 4 is a schematic perspective view illustrating a cleaning mechanism of the liquid ejection head.

FIG. 4 is a perspective view illustrating a configuration example of the cleaning mechanism 30. The cleaning mechanism 30 cleans a surface of the chip 101 of the liquid ejection head 3 on which the nozzle 110 that is the ink ejection port is formed. The cleaning mechanism 30 includes a base 32, an elastic tube 111 that is fixed to and disposed on the base 32, a suctioning tube 33 that is coupled to the elastic tube 111, and an ejection tray 35 that is arranged adjacent to the base 32. In a wiping process of the elastic tube 111, while an opening end of the elastic tube 111 is pressed against a nozzle formation surface, and a suctioning pump (not illustrated) connected with the elastic tube 111 with the suctioning tube 33 interposed therebetween is operated, a moving mechanism moves the base 32. Thus, while the elastic tube 111 is slid on the entire nozzle formation surface, ink is suctioned to an inside 112 of the elastic tube 111, and an edge of the elastic tube 111 performs wiping. The elastic tube 111 is a tubular wiping member that suctions a liquid and wipes the nozzle formation surface. By performing wiping, it is possible to suction and remove dust, a recording liquid that has been solidified or thickened and thereby attached, bubbles, and the like.

Figure 5:
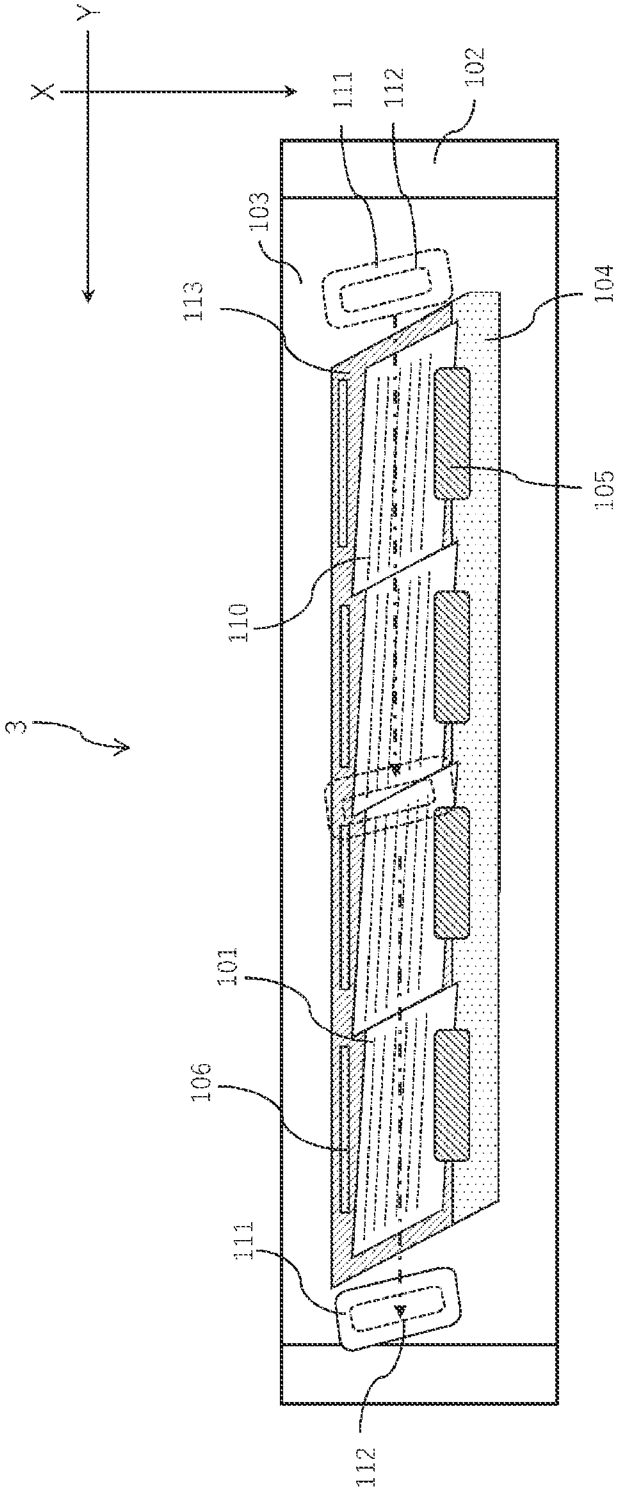
FIG. 5 is a plan view illustrating the liquid ejection head and a cleaning operation according to embodiment 1.
Figure 6:
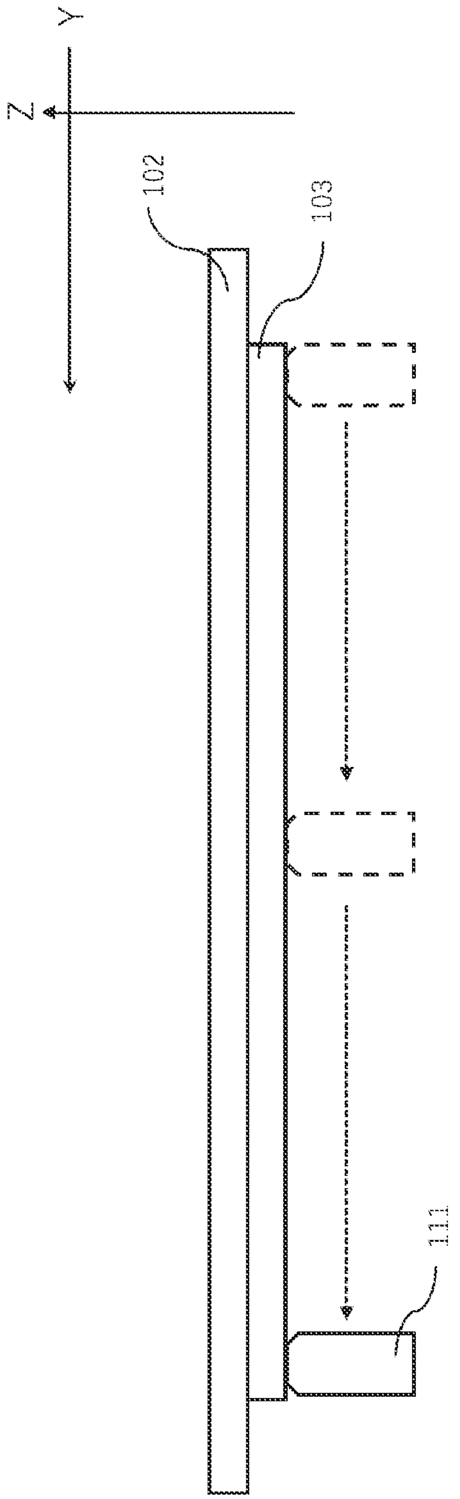
FIG. 6 is a front view illustrating the liquid ejection head and the cleaning operation according to embodiment 1.

FIGS. 5 and 6 are a plan view and a front view illustrating an operation of a tubular rubber member (elastic tube 111) that includes a suctioning mechanism used for a cleaning operation. Although a liquid ejection head mounted on a printer ejects ink to a printing target material and obtains a printed material, if printing is repeated, an ink droplet attaches to the surface of the chip 101, and printing quality deteriorates in some cases. In such a case, while the cleaning elastic tube 111 is brought into contact with the surface of the chip 101, and the chip 101 is depressurized and suctioned as described above, an area including the nozzle in the chip is scanned in a Y direction. At this time, the elastic tube 111 that is a rubber member passes a pass area 113 located in the area to which the sealing resin 104 has been applied. The pass area is usually set to the area that includes the nozzle 110. In this case, if the height of the sealing resin 104 is low in the pass area 113, the sealing resin 104 and the elastic tube 111 cannot come into contact with each other and, it is not possible to keep a reduced pressure and perform suctioning. Hence, cleaning performance deteriorates. Therefore, it is desirable to increase the height of the pass area 113 that the elastic tube 111 passes through as much as possible without making the height of the pass area 113 higher than the chip 101.

Conventional Configuration

Figure 7:
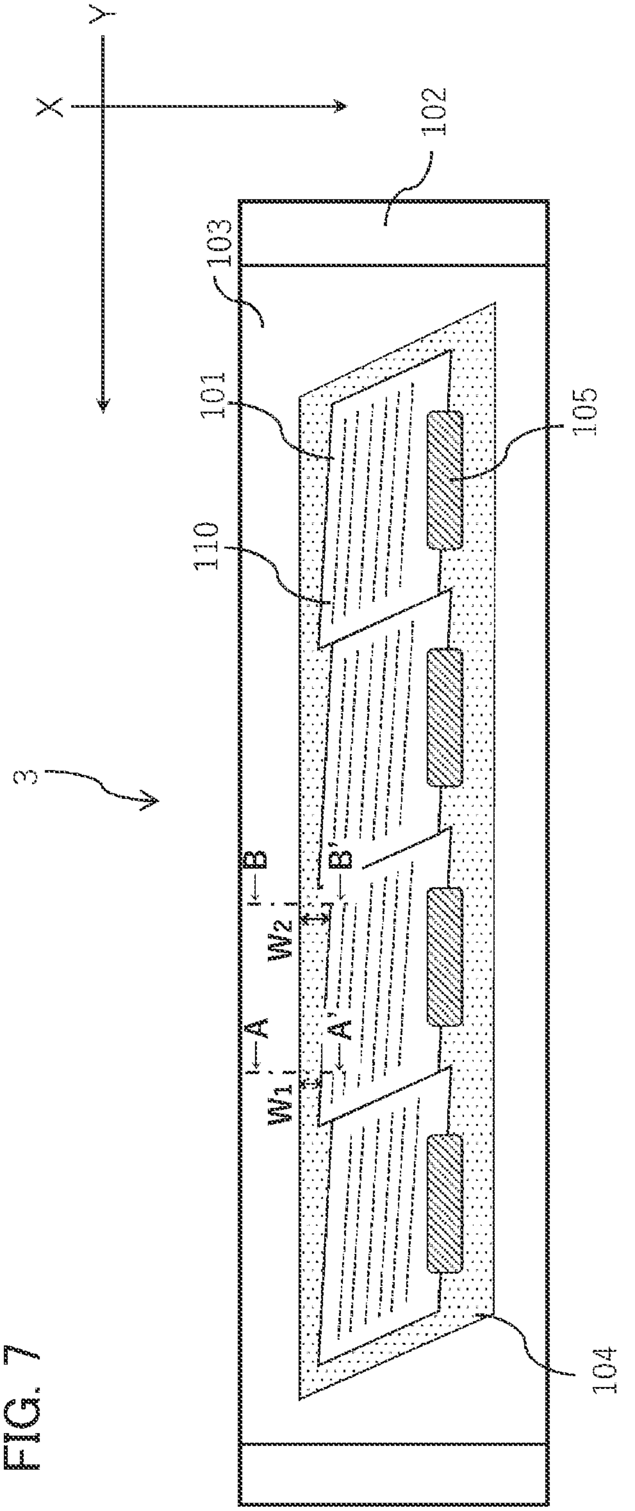
FIG. 7 is a plan view of a liquid ejection head according to a conventional configuration.
Figure 8:
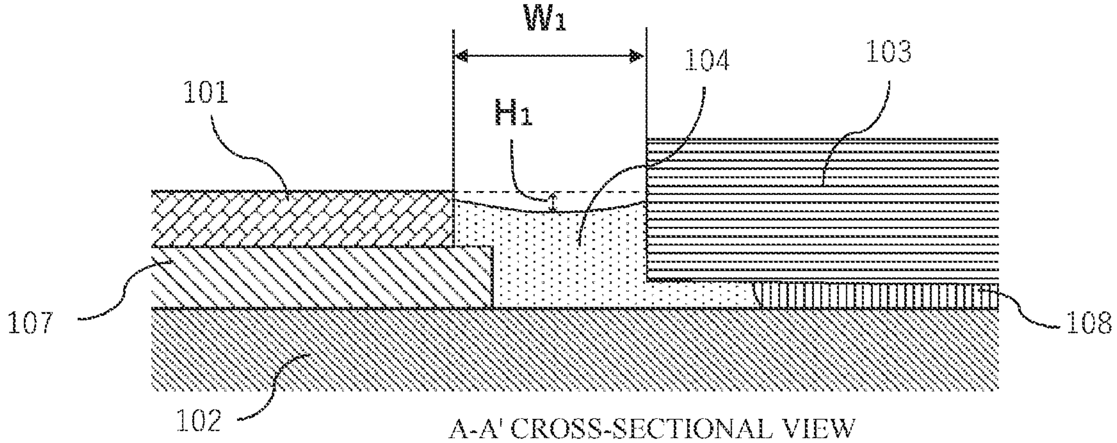
FIG. 8 is an A-A' cross-sectional view of an area of a narrow gap width according to the conventional configuration.
Figure 9:
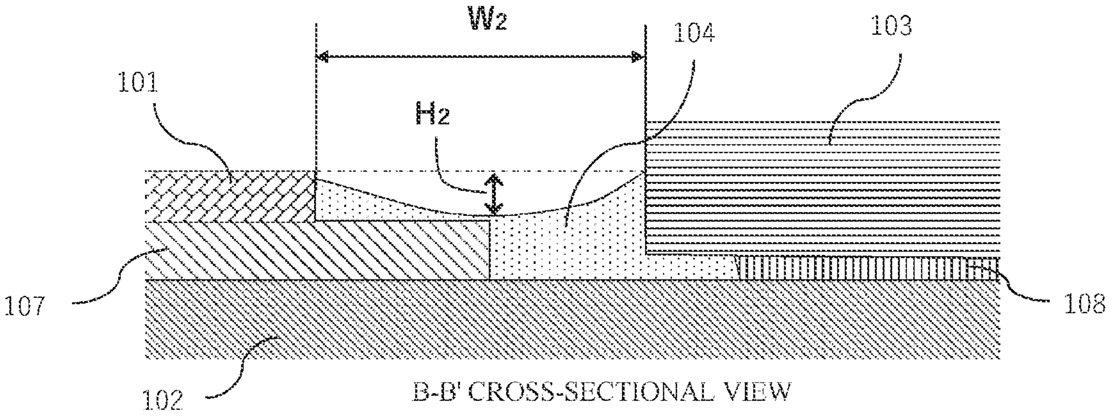
FIG. 9 is a B-B' cross-sectional view of an area of a wide gap width according to the conventional configuration.

The height relationship of the sealing resin 104 in a gap width between the chip 101 and the cover member 103 will be described with reference to FIGS. 7 to 9 illustrating the following conventional configuration. The chip 101 is inclined and disposed in the parallelogram shape, and therefore a distance from the ridge of the chip 101 to the ridge of the cover member 103 differs according to a chip position. That is, the ridge of the chip 101 and the ridge of the cover member 103 are not parallel. Therefore, there are a portion at which the distance between the chip 101 and the cover member 103 is short (distance $W_1$), and a portion at which the distance is long (distance $W_2$).

FIG. 8 illustrates a cross-section taken along an A-A' portion at which the distance between the chip 101 and the cover member 103 is short, and FIG. 9 illustrates a cross-section taken along a B-B' portion at which the distance is long. When the sealing resin 104 is applied to the gap between the chip 101 and the cover member 103, a depressed-type meniscus is formed along sidewalls of the cover member 103 and the chip 101. Note that, in FIGS. 8 and 9, and FIGS. 11A, 11B, 12, 16A, 16B, and 17 to be described later, hatching is applied to the chip 101 and the cover member 103, too for ease of illustration.

Here, when the gap width is narrow ($W_1$) as illustrated in FIG. 8, a surface tension per unit area is high, and, when the liquid level height of the sealing resin 104 is pulled up, the depressed meniscus has a low curvature. As a result, a maximum distance $H_1$ from the upper surface of the chip 101 to the liquid level of the sealing resin 104 becomes short. On the other hand, when the gap width is wide ($W_2$) as illustrated in FIG. 9, a depressed meniscus of a large curvature is formed. As a result, the force to pull up the sealing resin 104 weakens, the meniscus of the sealing resin 104 sinks, and a maximum distance $H_2$ from the upper surface of the chip 101 to the liquid level of the sealing resin 104 becomes long.

Thus, according to the conventional configuration, when the meniscus shape of the sealing resin 104 changes according to the position of the chip 101, the height of the sealing resin 104 becomes non-uniform. Such a state makes it difficult to perform control of increasing the height of the sealing resin 104 as much as possible without making the height of the sealing resin 104 higher than the upper surface of the chip 101.

Configuration of Present Embodiment

Figure 11A:
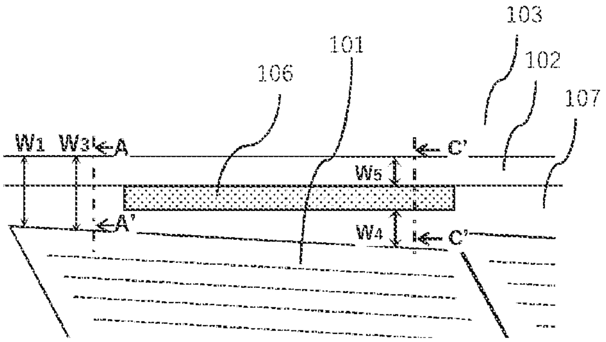
FIGS. 11A and 11B are C-C' cross-sectional views of the liquid ejection head before the sealing resin is applied according to embodiment 1.
Figure 11B:
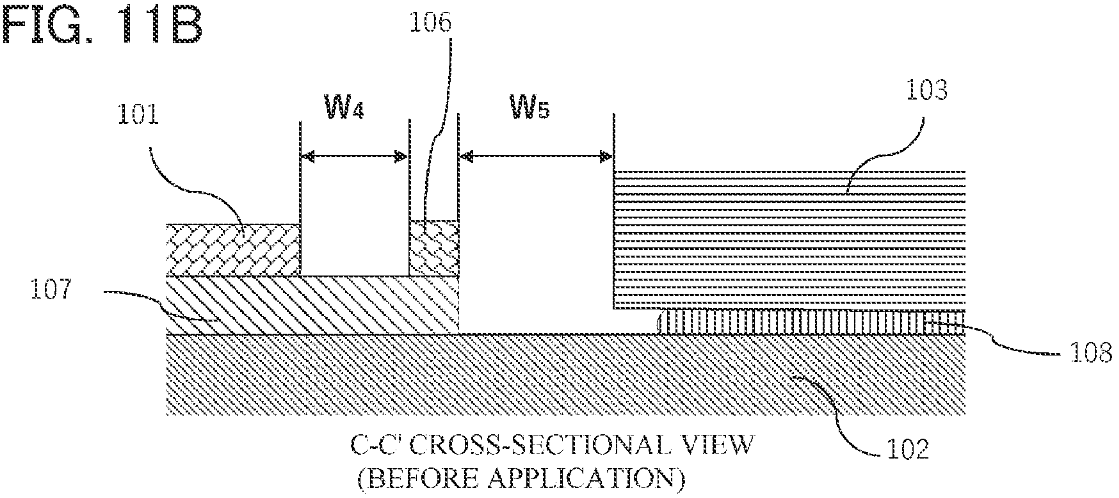
Figure 12:
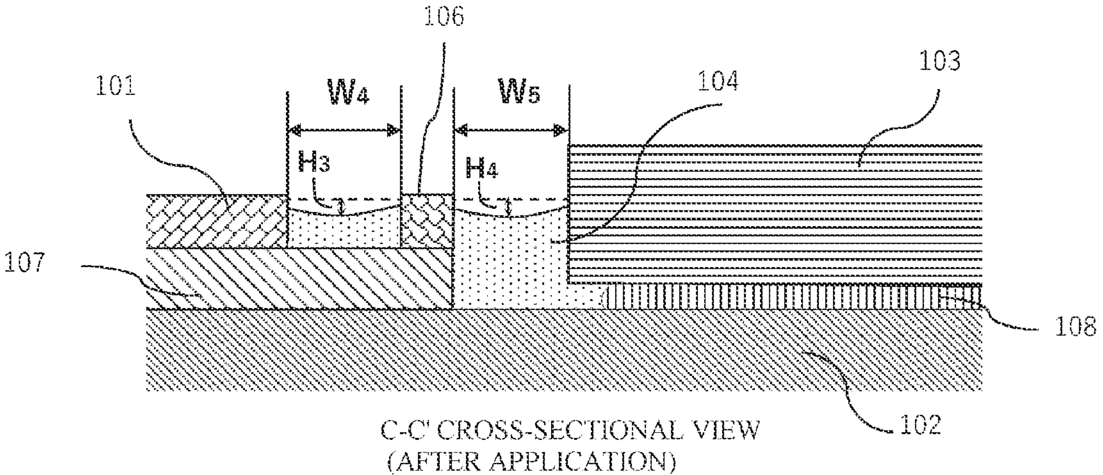
FIG. 12 is the C-C' cross-sectional view of the liquid ejection head after the sealing resin is applied according to embodiment 1.

Hence, the present embodiment employs a configuration where, as illustrated in FIG. 10, the protrusion 106 is provided on the chip support member 107 in the gap between the chip 101 and the cover member 103. The height of the sealing resin 104 in a case where the protrusion 106 is provided will be described with reference to FIGS. 11B and 12. FIG. 11B illustrates a cross-sectional view in which the protrusion 106 is provided in the gap between the chip 101 and the cover member 103 before the sealing resin 104 is applied (C-C' cross section), and FIG. 12 illustrates a cross-sectional view after the sealing resin is applied (C-C' cross section). The protrusion 106 according to the present embodiment adopts a structure whose projection from the chip support member 107 extends in the Y direction. The protrusion 106 has a portion that is not continuous in the entire Y direction, and is partially discontinuous. That is, the protrusion 106 is not provided at a portion at which the distance between the sidewall of the chip 101 and the sidewall of the cover member 103 that face each other is close.

In the present embodiment, the distance between the sidewall of the chip 101 and the sidewall of the cover member 103 that face each other differs per position in the Y direction. In this regard, the distance between the sidewall of the chip 101 and the sidewall of the cover member 103, the distance between the sidewall of the chip 101 and the sidewall of the protrusion 106, and the distance between the sidewall of the protrusion 106 and the sidewall of the cover member 103 are defined as illustrated in FIG. 11A. FIG. 11A is an enlarged view of an area surrounded by a broken line F in FIG. 10.

First, distances between the sidewall of the chip 101 and the sidewall of the cover member 103 at the portion at which the protrusion 106 is not provided in the Y direction are defined as the distance $W_1$ and a distance $W_3$. The distance $W_1$ is a distance at a position at which the distance between the sidewall of the chip 101 and the sidewall of the cover member 103 is short. The distance $W_3$ is a distance at a position at which the distance between the sidewall of the chip 101 and the sidewall of the cover member 103 is long. Furthermore, a distance between the sidewall of the chip 101 and the sidewall of the protrusion 106 that face each other at the portion at which the protrusion 106 is provided in the Y direction is defined as a distance $W_4$. Furthermore, a distance between the sidewall of the protrusion 106 and the sidewall of the cover member 103 at the portion at which the protrusion 106 is provided in the Y direction likewise is defined as a distance $W_5$. Note that the distance $W_4$ and the distance $W_5$ are set to positions associated with the distance $W_2$ in FIG. 7.

When the sealing resin 104 is applied to the gap between the chip 101 and the cover member 103, the menisci of the two sealing resins 104 are formed between the sidewall of the chip 101 and the sidewall of the protrusion 106 and between the sidewall of the cover member 103 and the sidewall of the protrusion 106 as illustrated in FIG. 12. The protrusion 106 is installed, and the gap width becomes narrow, so that the curvature of these two menisci becomes small, and it is possible to increase the liquid level.

The conventional configuration in FIG. 7 and the present embodiment in FIG. 10 are compared. According to the conventional configuration, the distance $W_1$ is 1 mm, the distance $W_2$ is 2 mm, and a difference between the distance $W_2$ and the distance $W_1$ is 1 mm. On the other hand, in the present embodiment, the protrusion 106 is provided at the position associated with the distance $W_2$, and the width of the protrusion is 0.4 mm. Hence, in the present embodiment, the distance $W_4$ and the distance $W_5$ are each 0.8 mm, and a difference from the distance $W_1$ is 0.2 mm. Here, it is desirable to make the differences between the distance $W_1$, the distance $W_3$, the distance $W_4$, and the distance $W_5$ 0.5 mm or less to make the liquid level of the sealing resin 104 uniform. The differences between the distance $W_1$ and the distance $W_3$ and between the distance $W_4$ and the distance $W_5$ are made 0.5 mm or less. In a case where the distance $W_1$ or the distance $W_3$ is a first distance, the distance $W_4$ is a second distance, and the distance $W_5$ is a third distance, differences between the first distance and the second distance, between the second distance and the third distance, and between the third distance and the first distance are each 0.5 mm or less. Hence, the length in the Y direction of the chip 101 is 15 mm, and an entire length L (Y direction) of the protrusion 106 is 10 mm. The entire length L of the protrusion 106 is the length that is approximately ⅔ of the length in the Y direction of the chip 101, and at which the protrusion 106 does not come into contact with the chip 101. As dimension differences between the distance $W_1$ and the distance $W_3$ and between the distance $W_4$ and the distance $W_5$ are less, meniscus curves of the sealing resins 104 have the same shape. As a result, it is possible to suppress variations of a distance $H_3$ and a distance $H_4$ from the chip 101 to the liquid level of the sealing resin 104. In this regard, each of the above-described distances needs to be determined as appropriate according to configurations and shapes of apparatuses, materials of sealing resins, and the like.

Note that the "uniform liquid level" described here does not necessarily mean that the liquid level height is strictly constant. The present embodiment describes that the liquid level is uniform when the liquid level height is within a constant range where the sealing resin 104 and the elastic tube 111 can come into contact at a time of wiping.

By employing this configuration, it is possible to control the height of the sealing resin 104 within the constant range. Consequently, it is possible to keep a reduced pressure at the time of wiping, and prevent deterioration of cleaning performance on the chip surface. Note that this is not the case as for an area (a side on which the sealing member 105 and the electrical wiring substrate 109 are disposed) other than the pass area 113 that the elastic tube 111 passes, and the height of the sealing resin 104 may have variations.

The protrusion 106 may be integrally molded with the support member 107. The protrusion 106 may be also molded as a member separate from the support member 107, or may be bonded to the support member 107 using an adhesive. The material of the protrusion 106 is preferably a member that is wettable for the sealing resin 104. This is because the member that has high water repellency and is hardly wettable lowers fluidity of the sealing resin 104, and does not bury the gap of a sealing groove. Furthermore, to avoid the elastic tube 111 from scraping the protrusion 106, it is preferable to make the height of the protrusion 106 lower than the height of the chip 101.

Modified Example

Figure 13:
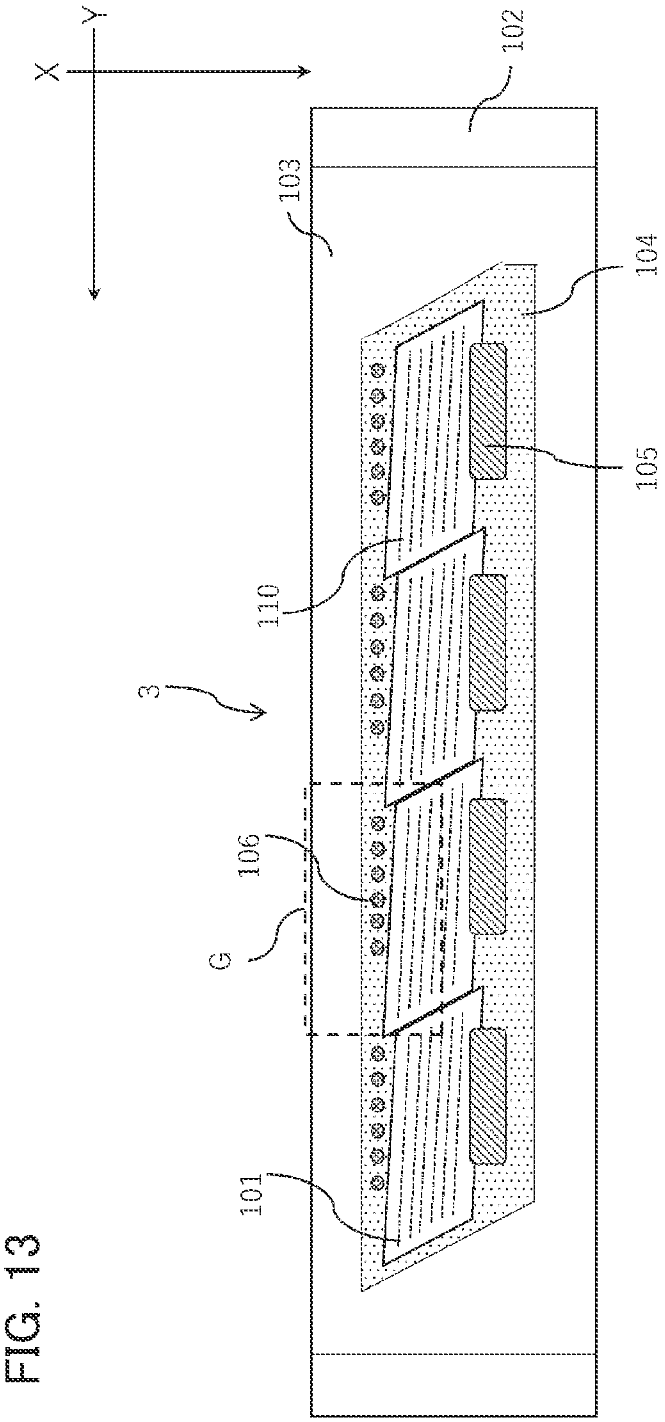
FIG. 13 is a plan view of the liquid ejection head having shapes of protrusions according to embodiment 1.
Figure 14A:
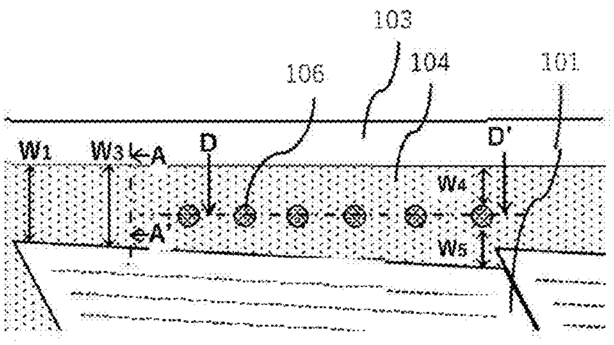
FIGS. 14A and 14B are D-D' cross-sectional views of the liquid ejection head having the shapes of the protrusions according to embodiment 1.
Figure 14B:
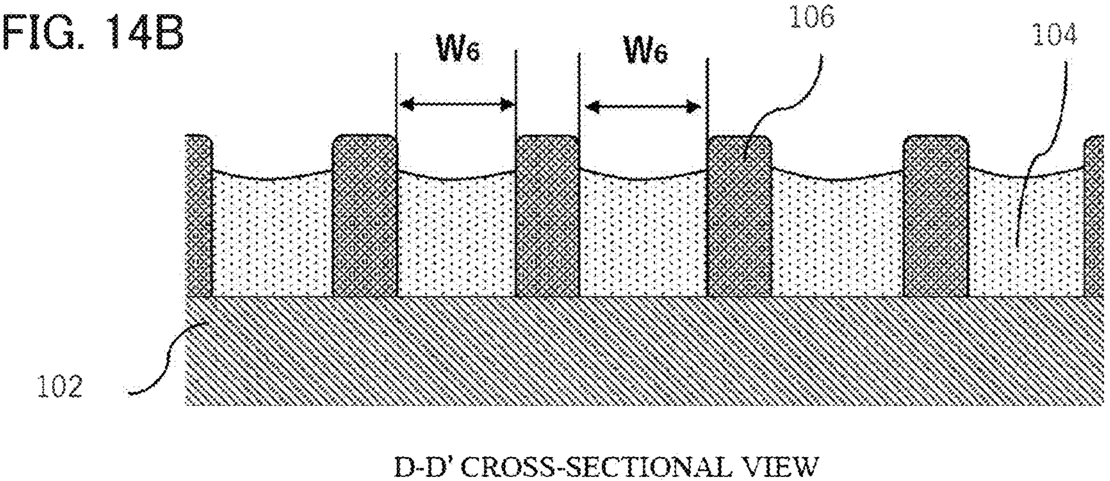

FIG. 13 illustrates a modified example of the protrusions 106. FIG. 14A is a view illustrating an enlarged area surrounded by a broken line G in FIG. 13. FIG. 14B is a D-D' cross-sectional view. The protrusions 106 according to the modified example are a plurality of (six in this case) columnar members aligned in the Y direction on the support member 107. A distance from the protrusion 106 located on the leftmost side in FIG. 13 to the protrusion 106 located on the rightmost side among the six protrusion 106 associated with the one chip 101 is substantially equal to the length in the Y direction of the protrusion 106 illustrated in FIG. 10. Furthermore, the distance $W_1$, the distance $W_3$, the distance $W_4$, and the distance $W_5$ in FIG. 14A are set to positions corresponding to the distance $W_1$, the distance $W_3$, the distance $W_4$, and the distance $W_5$ in FIG. 11A.

In this modified example, the diameter of the columnar protrusion 106 is 0.4 mm. The distance $W_1$ is 1 mm. The distance $W_3$ is set such that the difference between the distance $W_3$ and the distance $W_1$ is 0.5 mm or less. The distances $W_4$ and $W_5$ are 0.8 mm. Furthermore, a distance $W_6$ that is a width between the columnar protrusions 106 illustrated in FIG. 14B is 0.8 mm. By installing the protrusions 106 at equal intervals in this way, a meniscus size at which the sealing resin 104 is formed falls within a constant range in an X direction and the Y direction, so that it is possible to make the liquid level height of the sealing resin 104 substantially uniform.

In the above modified example, when the plurality of protrusions 106 are used, the plurality of protrusions 106 have the columnar shapes. However, as long as the liquid level height of the sealing resin 104 in the pass area 113 is within the constant range, the shape of the protrusion 106 does not matter. That is, by reducing dimension differences between the distance between the chip 101 and the cover member 103, the distance between the chip 101 and the protrusion 106, the distance between the protrusion 106 and the cover member 103, and the distance between the protrusions 106 in a case where there are the plurality of protrusions 106, it is possible to suppress the variations of the liquid level height.

Embodiment 2

Figure 15:
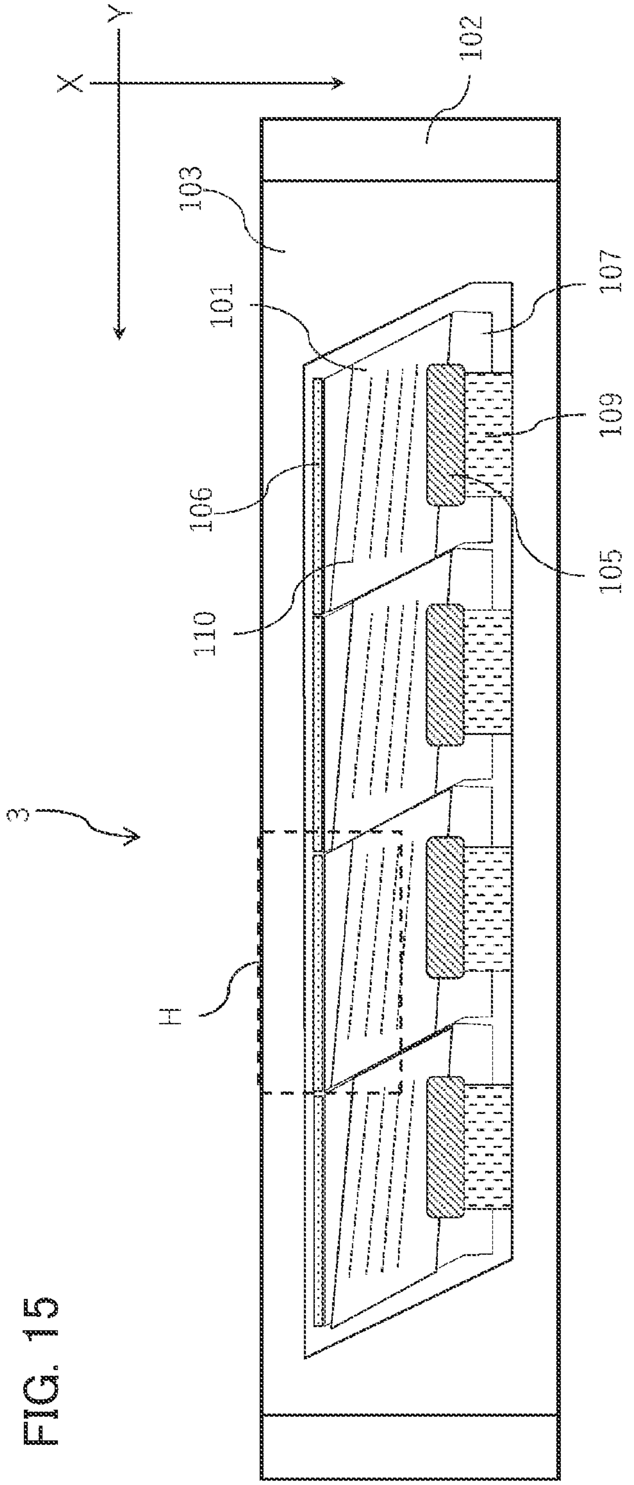
FIG. 15 is a plan view of a liquid ejection head before a sealing resin is applied according to embodiment 2.

Embodiment 2 will be described with reference to the drawings. The same components as those in embodiment 1 will be assigned the same reference numerals, and description thereof will be omitted. According to embodiment 1, it is necessary to install the protrusion 106 on each support member 107 of each chip 101, and therefore the number of parts and the number of steps increase. Hence, in the present embodiment, as illustrated in FIG. 15, the protrusion 106 is not provided on the support member 107, but is provided on the base substrate 102 in the gap between the chip 101 and the cover member 103. The method according to the present embodiment can also control the height of the sealing resin 104. Furthermore, in a case where a resin is used as the material of the base substrate 102, it is possible to suppress cost by integrally molding the base substrate 102 and the protrusions 106.

Figure 16A:
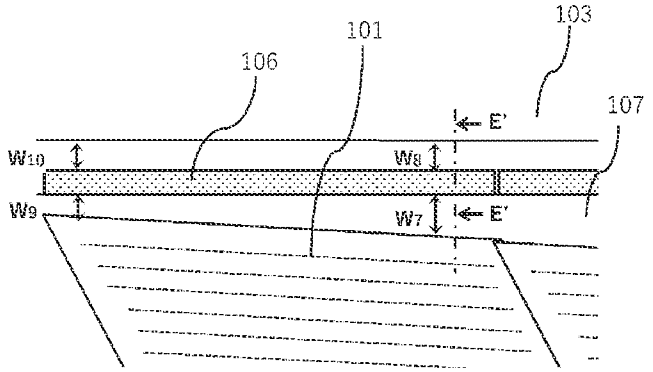
FIGS. 16A and 16B are E-E' cross-sectional views of the liquid ejection head before the sealing resin is applied according to embodiment 2.
Figure 16B:
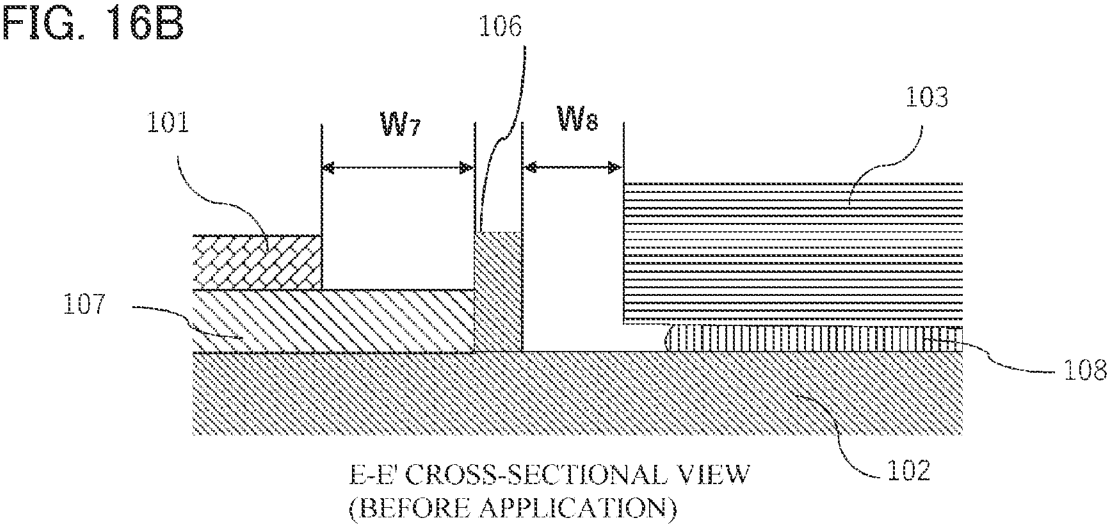
Figure 17:
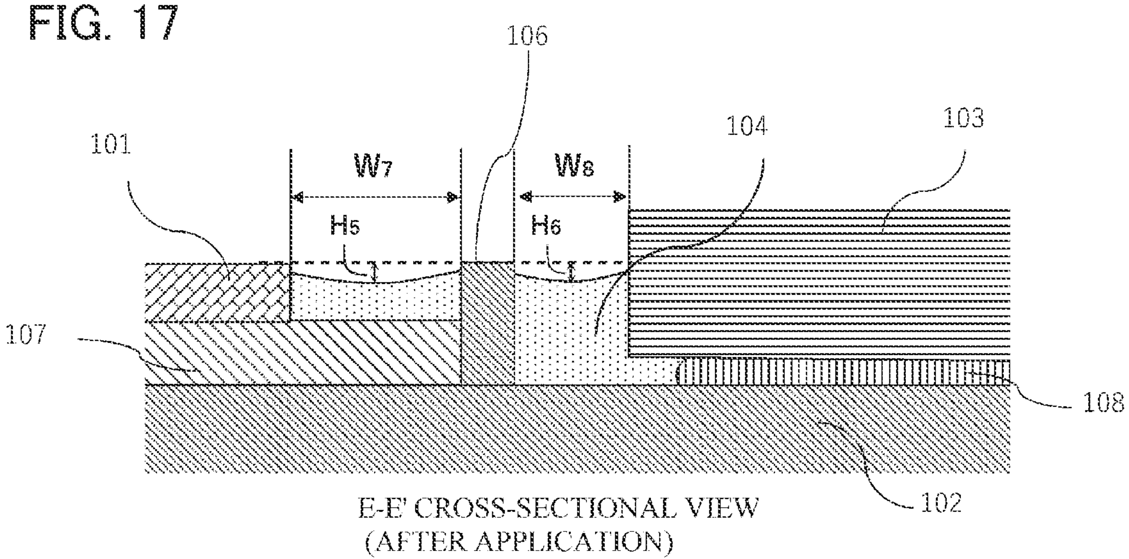
FIG. 17 is the E-E' cross-sectional view of the liquid ejection head after the sealing resin is applied according to embodiment 2.

The height of the sealing resin 104 in a case where the protrusions 106 are provided on the base substrate 102 will be described with reference to following FIGS. 16A, 16B, and 17. FIG. 16A is a partially enlarged view of a broken line H in FIG. 15. FIG. 16B is an E-E' cross-sectional view of FIG. 16A. FIG. 17 is the E-E' cross-sectional view after the sealing resin 104 is applied from a state in FIG. 16B. Similar to Embodiment 1, in the present embodiment, too, as differences between a distance $W_9$ and a distance $W_{10}$ and between a distance $W_7$ and a distance $W_8$ are less, it is possible to suppress variations of the height of the sealing resin, and it is desirable to make the differences between these distances 0.5 mm or less. Even such a configuration can suppress variations of a distance $H_5$ and a distance $H_6$ from the chip 101 to the liquid level of the sealing resin 104.

In the present embodiment, the protrusion 106 may be integrally molded with the base substrate 102. The protrusion 106 may be molded as a member separate from the base substrate 102, and bonded to the base substrate 102 using an adhesive. Furthermore, it is also concerned in the present embodiment that the elastic tube 111 scrapes the protrusion 106, and therefore it is preferable to make the height of the protrusion 106 lower than the height of the chip 101. Even the present embodiment makes it possible to suppress variations of the height of the sealing resin 104, and prevent deterioration of cleaning performance.

Modified Example

Above embodiment 1 and embodiment 2 have described the examples of the cases where the plurality of parallelogram chips 101 are continuously disposed, the wall surfaces of the plurality of chips 101 are non-linear, and the wall surface of the cover member 103 is linear. In these examples, when the liquid ejection head 3 is seen from the first direction (e.g., a positive direction of the Y direction in FIG. 10), the gap between the chip 101 and the cover member 103 gradually narrows, comes to a certain position (a boundary of the chip 101), and then expands at once.

In this regard, the present invention is not limited to this. It is possible to achieve the present invention by providing the protrusions 106 at the portions at which the distances of the gaps are long when the distances between the chips 101 and the cover member 103 are non-uniform in the gaps between the chips 101 and the cover member 103, and thereby control the liquid level heights within the constant range.

The present invention can be typically used to control the liquid level heights when the plurality of chips 101 are continuously disposed and the distances between the continuous wall surfaces of the plurality of chips 101 and the wall surface of the cover member 103 are non-uniform. The plurality of chips 101 are typically multiple chips having the same shape. In this case, the distances between the cover member 103 and the chips 101 cyclically change, and therefore the protrusions 106 are also cyclically disposed to meet the chips 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-155845, filed on Sep. 29, 2022, which is hereby incorporated by reference herein in its entirety.

What is claimed is:

1. A liquid ejection head comprising:
- a base substrate including a flow passage of liquid formed therein;
- chips disposed on the base substrate and configured to eject the liquid; and
- a cover member disposed on the base substrate so as to surround the chips, wherein
- a sealing resin is applied to gaps between a plurality of the chips and the cover member,
- a distance of the gaps between the chips and the cover member is non-uniform,
- the gaps are each provided with a protrusion, and
- ridges of sidewalls of the chips and the cover member that face each other are each linear, ridges of the chips and a ridge of the cover member are not parallel, and the distance between the chips and the cover member is non-uniform.

2. The liquid ejection head according to claim 1, wherein the protrusion is provided at a position in the gap at which the distance between the chip and the cover member is long.

3. The liquid ejection head according to claim 2, wherein the plurality of chips of a same shape are continuously disposed on the base substrate.

4. The liquid ejection head according to claim 3, wherein the plurality of chips are cyclically disposed to meet the plurality of respective chips.

5. The liquid ejection head according to claim 1, wherein
- the chips are disposed on a chip support member,
- the chip support member is disposed on the base substrate, and
- the protrusion is provided to the chip support member.

6. The liquid ejection head according to claim 1, wherein the protrusion is provided to the base substrate.

7. The liquid ejection head according to claim 1, wherein the protrusion is disposed at a portion in the gap at which the distance between the chips and the cover member is long, and has a continuous shape.

8. The liquid ejection head according to claim 1, wherein the protrusion is formed of a plurality of protrusions that are disposed at portions in the gap at which the distance between the chips and the cover member is long.

9. The liquid ejection head according to claim 8, wherein the plurality of protrusions are columnar protrusions.

10. A liquid ejection head comprising:
- a base substrate including a flow passage of liquid formed therein;
- chips disposed on the base substrate and configured to eject the liquid; and
- a cover member disposed on the base substrate so as to surround the chips, wherein
- a sealing resin is applied to gaps between a plurality of the chips and the cover member, a distance of the gaps between the chips and the cover member is non-uniform, the gaps are each provided with a protrusion, and in a case where a distance between the chips and the cover member at a portion at which the protrusion is not disposed in the gap between the chips and the cover member is a first distance, a distance between the chips and the protrusion at a portion at which the protrusion is disposed in the gap between the chips and the cover member is a second distance, and a distance between the protrusion and the cover member at a portion at which the protrusion is disposed in the gap between the chips and the cover member is a third distance, a difference between the first distance and the second distance, a difference between the second distance and the third distance, and a difference between the third distance and the first distance are each 0.5 mm or less.

11. A recording apparatus comprising:

a liquid ejection head; and a cleaning mechanism configured to clean the liquid ejection head, wherein the liquid ejection head includes:

a base substrate including a flow passage of liquid formed therein, chips disposed on the base substrate and configured to eject the liquid, and a cover member disposed on the base substrate so as to surround the chips, a sealing resin is applied to gaps between a plurality of the chips and the cover member, a distance of the gaps between the chips and the cover member is non-uniform, the gaps are each provided with a protrusion, ridges of sidewalls of the chips and the cover member that face each other are each linear, ridges of the chips and a ridge of the cover member are not parallel, and the distance between the chips and the cover member is non-uniform, and the cleaning mechanism includes a tube that comes into contact with a surface of the liquid ejection head on which the chips are disposed, and performs suctioning while moving.

* * * * *